United States Patent Office

2,939,791
TREATMENT OF BREWER'S WORT

William D. McFarlane, Toronto, Ontario, Canada, assignor to Canadian Breweries Limited, Toronto, Ontario, Canada No Drawing. Filed June 7, 1957, Ser. No. 664,190

9 Claims. (Cl. 99—48)

This invention relates to the treatment of brewer's wort with polyvinyl pyrrolidone, hereinafter referred to as PVP.

It has previously been proposed that PVP be used as a precipitating agent for removing tannins and tannin complexes from vegetable beverages, wherein the PVP is added to the beverage at cellar storage temperatures (32° F.) in an amount which is approximately equal in weight to the substances which are precipitated. A principal result was that with the exception of the removal of haze producing substances, the process appeared to have little effect upon other properties of the resulting beverage or upon the conventional methods employed for the production of such beverages. Moreover, in order to eliminate chill-haze producing substances from beer, it was necessary to employ an excess of PVP which resulted in leaving an amount of PVP in the finished beverage. Consequently, in some cases this would give rise to the appearance of a permanent haze on pasteurizing.

The present invention is based upon the discovery of certain unexpected advantages which can result from the employment of PVP in brewer's wort at a certain particular stage and in certain specified amounts and under certain specified conditions in the production of brewed beverages.

Salient objects of the invention are to improve the flavour of beer by eliminating the harsh lingering after-bitter taste which is a characteristic of trub remaining in the wort and to increase the utilization of hops insofar as bittering value is concerned, while reducing the amount of hops employed.

Another object of the present invention is to improve brewer's wort whereby the filtration or centrifugation hot or cold, can be greatly facilitated so as to obtain a clear wort at the fermenter with a greatly reduced content of the substances which give rise to chill-haze in the finished beer.

A further object of the invention is to enhance the advantages of hot filtration of the wort for the rapid removal of trub to the extent that further clarification thereof by cold filtration may not be particularly advantageous.

A further object of the invention is to improve the palate fullness and foam properties of beer by retaining a substantial part of the primary products of protein decomposition, namely proteoses, and peptones, which usually are precipitated and hence eliminated by the tannins.

A further object of the invention is to so process the wort as ultimately to eliminate or materially reduce the amount of chill-proofing agent which is normally added to beer or ale before bottling.

A further object of the invention is to provide a process wherein the PVP added to the wort is eliminated therefrom along with the substances which it precipitates and which in addition produces economic advantages through savings achieved which may exceed the cost of the PVP used in the process.

A still further object of the invention is to enhance the shelf life of beer both from the standpoint of taste and physical stability.

The most striking, visible change produced in wort by boiling either alone or with hops, is the formation of a flocculent coaglum, consisting mainly of one of the chief protein constituents of the malt, albumin. This constitutes what is known as the "hot break," to distinguish it from the break that occurs when filtered hot wort is cooled. The so-called "cold break" consists of aggregates of microscopically small colloidal particles of simple protein derivatives (peptones) from the malt combined with tannin from the malt and hops. These peptone-tannin compounds which comprise the troublesome "fine" wort-haze will redissolve in the wort on warming whereas the coarse or hot break does not redissolve in this way. Furthermore, the fine wort-haze does not precipitate immediately on cooling and hence may be difficult to remove completely by filtering and particularly by centrifuging. The colloids comprising the cold break are, in large measure, removed from the wort during cooling and fermentation but some remains in the beer and produces a definite instability, marked by the unwelcome appearance of a haze or turbidity. Moreover, a substantial amount of trub is retained in the wort which in the normal course results in a relatively harsh lingering after-bitter taste in the resulting beverage.

The removal of the peptones from the wort as tannin complexes is actually undesirable as they make an important contribution to the palate fulness and foam properties of beer. On the one hand, therefore, in respect to chill-haze in particular, the problem arises as to whether the protein derivatives should be eliminated or whether in terms of their desirable properties they should be largely be retained. On the other hand, whether or not the said derivatives are eliminated, reduced or retained according to past practice, there still remains in the wort an undesirable proportion of trub which lends to the promotion in the final beverage produced from the wort of a harsh lingering after-bitter taste.

I have devised a treatment of the wort which will largely eliminate the particular tannins which contribute to chill-haze while largely retaining the simple protein derivatives, with the result that not only is chill-haze largely reduced while maintaining in the beer or ale processed from this wort palate fulness and foam properties, but a reduction in the amount of the hops may be made by increasing hop utilization as well as flavour improvement by elimination of harsh lingering after-bitter taste ordinarily caused by an undesirable degree of trub retention. Moreover, I have found that the chill-proofing agent normally added to these beverages may be eliminated or substantially reduced in amount and that the savings achieved in hop reduction and reduction in the quantity of chill-proofing agent may exceed the cost of the added polyvinyl pyrrolidone. According to the invention, polyvinyl pyrrolidone is added in predetermined amount to the hopped wort preferably when it is boiling in the kettle or at least when it is in a relatively hot condition prior to filtration. This results in the formation of a precipitate which rapidly flocculates and settles out with the result that an increased amount of trub is removed from solution both as hot and cold break and it has the effect of a more complete reaction with the tannins contributing to haze, largely to eliminate them from the hot liquid together with the polyvinyl pyrrolidone present in the solution. I have found that polyvinyl pyrrolidone added in this manner precipitates tannin from solution, together with increased amounts of trub producing improvements in the beer and ale finally resulting, whereas other well-known tannin precipitants of the protein class such as gelatin form a precipitate only on cooling and do not have comparable effects.

To illustrate the beneficial effects of PVP, many experiments were carried out in a pilot brewery. I have found that an addition of PVP in a range of 1 to 5 lbs. per 100 barrels of wort produced beneficial results when the PVP is added while the wort is hot and prior to filtration. I prefer, however, to add the PVP to the boiling wort in the kettle after the addition of the last hops and prior to the appearance of the hot break.

The general procedure adopted in the pilot brewery was to split the brew at the end of kettle boiling as follows:

An all malt wort (12° Plato) is kettle boiled for 1½ hours with a hopping rate usually about 0.42 lb. per barrel. At the end of the boiling period, half of the 12 gal. brew is run off through a hop strainer to a Pyrex glass hot wort receiver. An aqueous solution of PVP is added to the remainder of the wort in the kettle at a rate equivalent to 4.5 lbs. PVP per 100 barrels of wort, and the boiling continued for one minute to ensure complete mixing. The boiling wort is discharged through a hop strainer to a second, identical, hot wort receiver so the nature of the hot break can be readily observed. The worts are filtered at about 180° F. using a Carlson plate filter with a single coarse cellulose-asbestos sheet and Celite 545 as filter aid at a rate of 2 oz. per 10 gal. wort. The filtered worts are cooled to 68–70° F. using a De Laval plate heat exchanger.

Photometric turbidity measurements are made on samples of the two worts. The turbidity is again measured after the samples have been filtered at room temperature and held at 32° F. for 18 hours. The relative turbidities are expressed as part per million silicon dioxide by reference to a calibration curve prepared with standard suspension of $SiO_2$ in water.

The results of a typical experiment are as follows:

TABLE I

*Effect of PVP on haze formation in ale wort*

| Treatment | Relative Haze |
|---|---|
| Wort filtered at 180° F. and cooled to 68° F.: | |
| A. Control (very heavy haze) | 1,600 |
| B. PVP (almost clear) | 222 |
| Wort filtered at 68° F. and held at 32° F. for 18 hours: | |
| A. Control | 486 |
| B. PVP | 161 |
| After fermentation beers filtered at 68° F. and held at 32° F. for 18 hours: | |
| A. Control | 222 |
| B. PVP | 148 |

It will be seen that the PVP treatment has a marked effect in increasing the amount of trub removed as hot and cold break and hence reducing the amount of potential chill-haze materials in the wort at the fermenter. It was very evident from visual comparison of the two worts in the hot wort receivers that the PVP treatment gives more hot break with much larger flocs which settle more rapidly and pack more densely on the bottom of the container. The PVP treatment increases the weight of trub removed by hot filtration by a significant amount, equivalent to about 130 p.p.m. solids in the original wort. Notwithstanding, the true protein nitrogen content of the PVP treated wort, as determined by alcohol precipitation, is found to be higher than the untreated control wort by about 5%. In an experiment to determine the effect of PVP on the weight of hot trub separated, half of the wort from the hop jack, at a temperature of about 180° F., was treated with PVP at a rate equivalent to 4.5 lbs. per 100 barrels of wort and the two batches were centrifuged hot (170° F.). A Sharples Continuous Centrifuge was used as it is particularly suitable for collecting the trub in the bowl, without loss. The trub was dried at 105° C. for 24 hours and weighed and the weight of trub from the PVP treated wort corrected for the amount of PVP added on the assumption that all of the added PVP was precipitated in the trub. The results showed an increase of 17% in the amount of trub after PVP treatment which is equivalent to 128 p.p.m. original wort solids. Centrifuging the cold wort after PVP treatment gave a remarkably clear wort, when a De Laval gyro tester was used.

Further experiments show that the action of PVP as a wort clarifying agent is influenced by several factors, e.g. the composition of the wort as influenced by the amount of malt and hops employed, the pH of the wort and the time at which the PVP is added. Best results are obtained at pH 4.9–5.0 and when the PVP is added after the addition of the last hops and before the end of the kettle boil or in the hot wort receiver, but substantially equivalent results have been obtained at pH 5.3 or when the PVP is added at the beginning of the boil. Perhaps the most important factor is the amount of PVP as there is an optimum range, above or below which the results are less satisfactory. For an all malt ale (12° Plato) and a hopping rate of 0.42 lb. per barrel I have used 4.0–4.5 lbs. PVP per 100 barrels and 3.0–3.5 lbs. per 100 barrels for a lager (12° Plato) brewed with 20% cereal adjunct and a hopping rate of 0.31 lb. per barrel.

In lagers using a greater amount of unmalted cereal addition, the PVP will be reduced and accordingly the amount of PVP added is relative to the rate of hopping and malt addition. In either case, the optimum amount of PVP used is not critical but will apply within the ranges given in general relation to the amount of tannins in the wort and which, of course, depends upon the tannin content of the malt and hops and the amounts of the latter used.

Under optimum conditions PVP with hot filtration alone produces a wort which is comparatively clear at the fermenter. One effect of PVP is therefore to enhance the advantages of hot filtration for the rapid removal of a large amount of trub to the extent that further clarification by cold filtration may be of questionable value. It is generally agreed by brewers that the more rapid and complete the removal of trub from hot wort, the less likelihood of trub flavours in the finished beer. I have found that centrifuging the cold wort after PVP treatment gives a remarkably clear wort and centrifuging the hot wort after PVP treatment removes more trub than cold wort centrifuging without PVP.

By processing the hopped wort in the manner described the PVP is removed along with the tannins and trub and any trace thereof noted was less than five parts per million. While PVP is non-toxic, nevertheless the retention of any substantial amount thereof in the beer or ale may have the result of producing a haze during pasteurization.

Taste tests on the finished beers indicate that the hop bitter is more pronounced as the result of the PVP treatment. This is confirmed by chemical analysis which shows an appreciable increase in the "bitter value" of the beer (expressed as grams isohumulones per barrel) due to the PVP treatment. Table II shows the effect of the PVP treatment on the bitter value of the beer.

TABLE II

*Effect of PVP on the hop bitter content of beer*

| Modification in Press | Beer Bitter Value | Wort Haze | |
|---|---|---|---|
| | | 68° F. | 32° F.[1] |
| 1. Ale wort, filtered at 160–180° F. Hop rate, 0.42 lbs. per bbl.: | | | |
| (a) Control | 2.07 | 1,200 | 514 |
| (b) PVP treated (4.5 lbs. per 100 bbl.) | 2.57 | 260 | 177 |
| 2. Lager wort, filtered at 160°–180° F. Hop rate, 0.31 lbs. per bbl.: | | | |
| (a) Control | 1.12 | 444 | 232 |
| (b) PVP treated (3 lbs. per 100 bbl.) | 1.64 | 81 | 100 |

[1] Wort filtered at 68° F. and held at 32° F. for 18 hours.

PVP has a marked hop sparing action insofar as bittering value is concerned, and I have found that the effect is most marked at the higher hop levels. This action of PVP is probably indirect because PVP does not react with isohumulones to form addition complexes of greater solubility as the partition rates of isohumulone between immiscible solvents is not changed in the presence of PVP. The adsorption of bitter substances on the cold trub, particularly during fermentation, is well recognized so the effect of PVP in increasing the bitter value of the beer may be ascribed to the removal of a greater proportion of the trub as hot break and hence at temperatures at which the adsorption of isohumulones is at a minimum.

The effect of PVP in reducing the chill-haze in the after-fermentation beers indicates that the treatment may entirely eliminate or at least it will largely reduce the amount of enzyme chill-proof required to stabilize the finished beers.

BREWERY EXPERIMENTS

The PVP process developed in the pilot brewery has been tested in an ale brewery which produces a 400 barrel brew employing a 12° Plato all malt wort, a hopping rate of 0.36 lb. per barrel and powder filtration of the wort at 68° F. For my experiments, the beers were racked down from the fermenter to storage at 34° F. and held for 6 days. The beers were then powder-filtered, returned to the storage tanks for the addition of enzyme chill-proofing and finally after a further one day storage, at 34° F., pulp-filtered to the bottling tank and from there bottled and pasteurized.

In the first brewery trial PVP was added in the kettle just before the end of the boil at a rate of 4 lbs. per 100 bbl. and this was the only departure from regular brewery practice. The PVP treatment had a marked effect on the hot break which separates in large flocs and settles rapidly, thus leaving much more trub in the hot wort tank and hence reducing the load on the filter. The filtration of the wort at 68° F. is much easier after the PVP treatment, there being less back pressure on the filter, thus permitting a higher flow rate for a given pressure and a longer run with less chance of having to break down the filter. After filtration at 68° F. the PVP treated wort is much more brilliant when compared to the control. Fermentation proceeds normally.

Turbidity measurements on the wort and after-fermentation beer confirm the beneficial effect of PVP as demonstrated in the pilot brewery. Analysis of the finished beer, when compared to a regular beer, show that the PVP treatment enhances the foam properties of the beer, slightly but significantly increases the true protein nitrogen content and increases the bitter value by at least 20%, i.e. from 1.98 to 2.41 grams isohumulones per barrel, and there is no significant change in the degree of oxidation (ITT). In a taste evaluation by a panel of brewers the PVP sample is preferred, although it is more bitter. This is a clean, pleasant hop bitter free from the harsh, lingering after-bitter often referred to as "trub flavour."

In a second brewery trial the experiment has been repeated but the hop rate is reduced from 145 lbs. to 125 lbs. per brew by taking 10 lbs. off both the first and second hops, the amount of the last hops remaining unchanged. Also half the usual amount of enzyme preparation is used to chill-proof the beer brewed with PVP treated wort. The results of the first trial were confirmed but reducing the hop rate by 16%, in the case of the PVP treated wort, brought the bitter value of the finished beer to approximately the same value as the regular beer and the taste panel failed to distinguish between the beers on the basis of bitterness. The chill stability of the PVP beer is as good if not better than the regular beer even although only half the amount of chill-proof is used. In further brewery trials of this process, chill-proof has been reduced to one fifth of the usual amount and the physical stability of the product has still been excellent.

I have also observed that in these experiments the treatment of the wort with PVP enhanced the shelf life of the beer, both from the standpoint of taste and physical stability. For example, after two months' storage at 35° F. the regular beer showed a considerable amount of sediment on the bottom of the bottle, whereas the beer that had received the PVP treatment remained clear and free from sediment.

Not only have the above number of improved results been achieved through the addition of PVP in the manner and under the conditions specified, but economic advantages result as well, not only in handling but I have found that the savings which are effected by the reduction of the amount of hops used and the reduction in the amount of chill-proofing material used represents savings which could exceed the cost of the PVP added to the product.

While the wort may be hot filtered or centrifuged to remove the precipitate, it is of course understood that it may be similarly clarified by merely permitting a substantial period of settling. Consequently, it is intended in this disclosure that the expression "before removal of trub" is to be considered synonymous to settling, filtering, centrifuging.

What I claim as my invention is:

1. In the brewing of wort for hopped fermented beverages, the method of removal therefrom of substantial quantities of trub and chill-hazing substances in addition to the usual components removed at the hot break, which comprises adding to the wort when at a temperature above 180° F. before removal of trub precipitated therefrom and at least before discharge of the wort from the hot wort receiver to the fermenter, a predetermined quantity of polyvinyl pyrrolidone sufficient to precipitate from the wort additional quantities of trub and chill-hazing substances as well as substantially all the added polyvinyl pyrrolidone to produce a wort at the fermenter of substantially improved clarity and, in a finished beverage fermented therefrom, an increased yield of hop bitter substances.

2. In the brewing of wort for hopped fermented beverages, the method of removal therefrom of substantial quantities of trub and chill-hazing substances in addition to the usual components removed at the hot break, which comprises adding to the wort when at a temperature above 180° F. before removal of trub precipitated therefrom a predetermined quantity of polyvinyl pyrrolidone sufficient to precipitate from the wort additional quantities of trub and chill-hazing substances as well as substantially all the added polyvinyl pyrrolidone, to produce a wort at the fermenter of substantially improved clarity and, in a finished beverage fermented therefrom, an increased yield of hop bitter substances.

3. In the brewing of wort, the method of removal therefrom of substantial quantities of trub and chill-hazing substances in addition to the usual components removed at the hot break, which comprises adding to the wort when at a temperature above 180° F. before removal of trub precipitated therefrom, a predetermined quantity of polyvinyl pyrrolidone sufficient to precipitate from the wort additional quantities of trub and chill-hazing substances, as well as substantially all the added polyvinyl pyrrolidone to produce a wort at the fermenter of substantially improved clarity and, in a finished beer fermented therefrom, an increased yield of hop bitter substances.

4. In the brewing of wort for hopped fermented beverages, the method of removal therefrom of substantial quantities of trub and chill-hazing substances in addition to the usual components removed at the hot break, which comprises adding to the wort when at a temperature above 180° F. before removal of trub precipitated therefrom, and at least before discharge of the wort from the hot wort receiver to the fermenter, from about 1 to 5 lbs. of polyvinyl pyrrolidone per 100 barrels of wort whereby additional trub, chill-hazing material and substantially all of said polyvinyl pyrrolidone are precipitated from said wort to produce at the fermenter a wort of substantially improved clarity and providing in the finished beverage fermented therefrom an increased yield of hop bitter substances.

5. In the brewing of wort, the method of removal therefrom of substantial quantities of trub and chill-hazing substances in addition to the usual components removed at the hot break, which comprises adding to the brew, when it is boiling and after the last hops have been introduced thereto, a predetermined quantity of polyvinyl pyrrolidone sufficient to precipitate from the brew additional quantities of trub and chill-hazing substances as well as substantially all the added polyvinyl pyrrolidone.

6. In the brewing of wort, the method of removal therefrom of substantial quantities of trub and chill-hazing substances in addition to the usual components removed at the hot break, which comprises adding to the brew, when it is in a hot condition above 180° F. and before removal of trub precipitation therefrom, about 1 to 5 lbs. of polyvinyl pyrrolidone per 100 barrels of wort to precipitate from the brew additional quantities of trub and chill-hazing substances as well as substantially all the added polyvinyl pyrrolidone.

7. In the brewing of hopped wort as claimed in claim 1, the addition of polyvinyl pyrrolidone at a temperature between 180° F. and 212° F.

8. In the brewing of wort, the method of removal therefrom of substantial quantities of trub and chill-hazing substances in addition to the usual components removed at the hot break, which comprises adding to the brew from about 1 to 5 lbs. of polyvinyl pyrrolidone per 100 barrels of wort when the brew is at a temperature between 180° F. and 212° F. and before removal of precipitated trub therefrom whereby additional trub, chill-hazing material and substantially all of said polyvinyl pyrrolidone are precipitated from said brew.

9. In the brewing of wort, the method of removal therefrom of substantial quantities of trub and chill-hazing substances in addition to the usual components removed at the hot break, which comprises adding to the brew when it is at a temperature above 180° F. a predetermined quantity of polyvinyl pyrrolidine sufficient to precipitate from the brew additional trub, chill-hazing substances and substantially all of said polyvinyl pyrrolidone.

References Cited in the file of this patent

UNITED STATES PATENTS

| | | |
|---|---|---|
| 2,688,550 | McFarlane | Sept. 7, 1954 |
| 2,811,449 | Witwer et al. | Oct. 29, 1957 |